United States Patent
McIntee

(10) Patent No.: US 9,233,748 B2
(45) Date of Patent: Jan. 12, 2016

(54) ROADABLE, ADAPTABLE-MODULAR, MULTIPHIBIOUS-AMPHIBIOUS GROUND EFFECT OR FLYING, CAR-BOAT-PLANE OR SURFACE-EFFECT MOTORCYCLE

(76) Inventor: James William McIntee, Smithtown, NY (US)

( * ) Notice: Subject to any disclaimer, the term of this patent is extended or adjusted under 35 U.S.C. 154(b) by 540 days.

(21) Appl. No.: 13/597,634

(22) Filed: Aug. 29, 2012

(65) Prior Publication Data

US 2013/0168489 A1  Jul. 4, 2013

Related U.S. Application Data

(60) Provisional application No. 61/583,060, filed on Jan. 4, 2012.

(51) Int. Cl.
| | |
|---|---|
| *B64C 37/00* | (2006.01) |
| *B64C 3/38* | (2006.01) |
| *B64C 5/16* | (2006.01) |
| *B64C 39/00* | (2006.01) |
| *B64C 27/08* | (2006.01) |

(52) U.S. Cl.
CPC ... *B64C 3/38* (2013.01); *B64C 5/16* (2013.01); *B64C 27/08* (2013.01); *B64C 37/00* (2013.01); *B64C 39/00* (2013.01); *B64C 2211/00* (2013.01)

(58) Field of Classification Search
CPC .............. B64C 5/16; B64C 3/38; B64C 39/00
USPC .......................... 244/2, 6, 7 R, 45 R, 49, 45 A
See application file for complete search history.

(56) References Cited

U.S. PATENT DOCUMENTS

| | | | | |
|---|---|---|---|---|
| 3,322,223 | A | * | 5/1967 | Bertelsen ..................... 180/120 |
| 3,908,783 | A | * | 9/1975 | Joerg et al. .................. 180/116 |
| 4,080,922 | A | * | 3/1978 | Brubaker ................. B63B 1/30 114/282 |
| 4,171,784 | A | * | 10/1979 | Eickmann ......................... 244/2 |
| 4,173,321 | A | * | 11/1979 | Eickmann ................... 244/17.23 |
| 4,928,907 | A | * | 5/1990 | Zuck ................................. 244/6 |

(Continued)

FOREIGN PATENT DOCUMENTS

DE        3804561        8/1989  ............... B64C 5/00

OTHER PUBLICATIONS

Carnett, John B., "Flying on Water", Popular Science, Jan. 1, 1997, pp. 50-54, Published by Time 4 Media Inc., See, URL: http://www.popsci.com/archive-viewer?id=KIEIX2X-na8C&pg=null&query=1997.

*Primary Examiner* — Brian M O'Hara
(74) *Attorney, Agent, or Firm* — Gerald T. Bodner

(57) ABSTRACT

A roadable, adaptable-modular, multiphibious-amphibious ground-effect or flying, car-boat-plane or surface-effect motorcycle. A pivoting wing using the NACA 23112 airfoil provides longitudinal stability through changes in wing or power settings. The airfoil can also be "locked" in place to provide conventional aircraft type controls. The wings fold for driving mode or can be removed. Surface-effect sensor rods provide the automatic altitude control for operations in surface-effect mode. Horizontal stabilizer and elevator provide trim and balance to level the vehicle for passenger comfort and optimal landing attitude. The hull/fuselage consists of three main modules: The main central module (engine, transmission, passengers, wings and cargo storage), the forward module and the aft module which may include one or two wheels with or without a motor, engine, batteries or fuel and differential.

14 Claims, 1 Drawing Sheet

Side view

(56) References Cited

U.S. PATENT DOCUMENTS 5,050,817 A * 9/1991 Miller ............................ 244/2
5,417,386 A * 5/1995 Wernicke ....................... 244/2
6,082,665 A * 7/2000 Spitzer ........................... 244/2
6,164,591 A    12/2000 Descatha ...................... 244/48
2013/0112804 A1 * 5/2013 Zhu ................................ 244/2

* cited by examiner

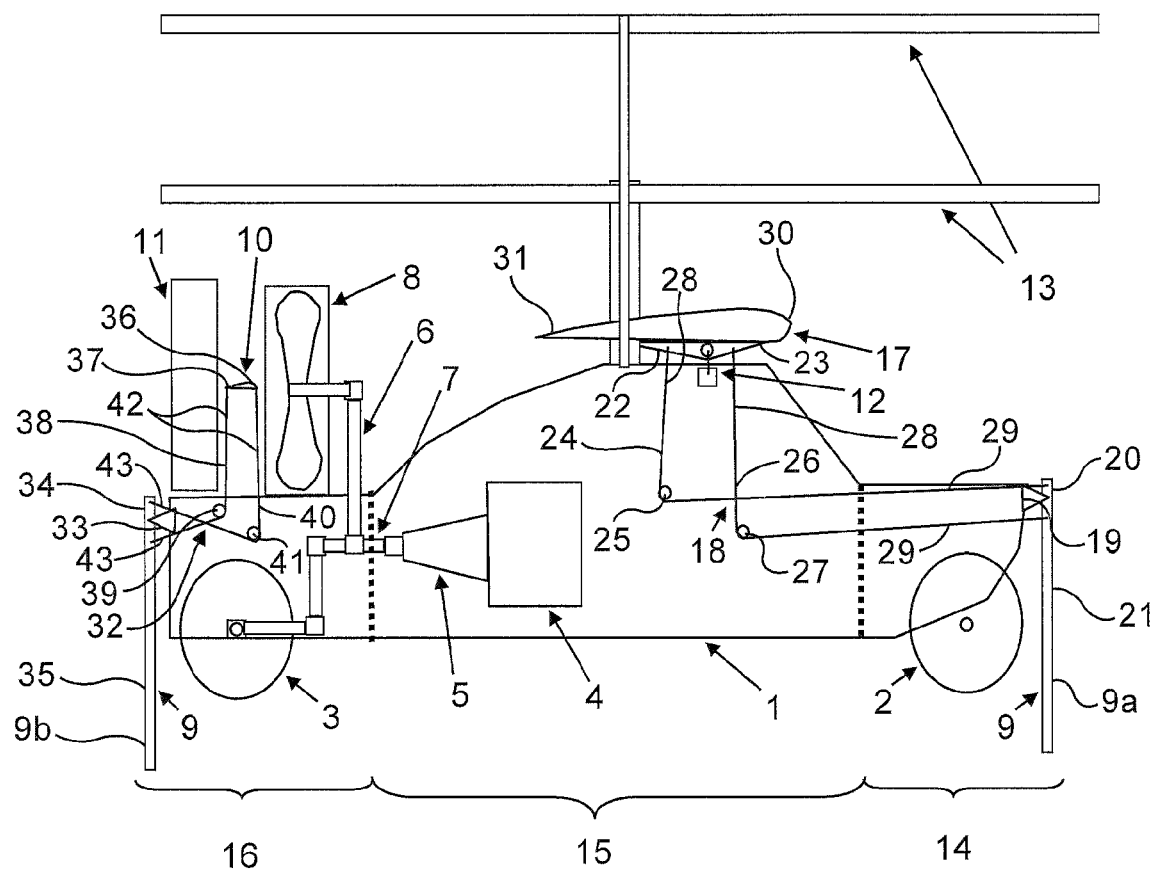
Side view

ROADABLE, ADAPTABLE-MODULAR, MULTIPHIBIOUS-AMPHIBIOUS GROUND EFFECT OR FLYING, CAR-BOAT-PLANE OR SURFACE-EFFECT MOTORCYCLE

CROSS-REFERENCE TO RELATED APPLICATIONS

This application claims priority from Provisional U.S. patent application No. 61/583,060 (filed on Jan. 4, 2012).

REFERENCES CITED

U.S. Patent Documents

U.S. Pat. No. 6,164,591 Dec. 26, 2000 Descatha

Foreign Patent Documents 3804561 8/1989 Germany . . . 244/12.1

Other Publications

"Flying on Water", Popular Science, January 1997, pp. 50-54.

FIELD OF INVENTION

The present invention relates to improvements in: cars, boats, yacht tenders, airboats, aircraft, Ground-Effect Vehicles (GEV) (also known as: wing-in-ground-effect (WIG) vehicle, flare-craft, sea skimmer, ekranoplan, Skim-Machine, or a wing-in surface-effect ship (WISE), hovercraft, flying/surface-effect hover-wing and other forms of personal point to point, sports, government use and recreational types of transportation that are able to take off and land in water or at airports as well as drive on roads.

BACKGROUND OF THE INVENTION

There is currently a very wide variety of transportation solutions that include: cars, boats, airboats, aircraft, Ground-Effect Vehicles (GEV). Most of the currently existing transportation solutions tend to focus on a single or dual use such as amphibious aircraft, flying car (roadable aircraft) or car-boats. None of the existing transportation solutions allow for adaptability to a wide variety of customer requirements and a wide variety of environments. Examples of simplified versions of the invention would be an airboat-motorcycle (no wings) or ground-effect-motorcycle which is licensed as a motorcycle and a boat which has folding wings to allow storage in a standard garage. The three wheeled configuration helps to keep weight to a minimum which improves performance (larger useful payload, more passengers or better fuel/battery economy) and simplifies licensing. Ground-Effect Vehicles have been in use for many decades but have not gain popularity. One reason that the inventor believes the GEV has not been popular is due to the limitation of not being able to drive the GEV on roads. The subject of this patent is a roadable, adaptable-modular, multiphibious-amphibious ground-effect or flying, car-boat-plane or surface-effect motorcycle invention which can more fully address that issue while allowing for the flexibility to adapt the vehicle to the needs of each customer.

The advantages of a roadable airboat, GEV or aircraft are well known from prior inventions such as amphibious cars. The amphibious car can basically use any body of water as an additional "road" to and from other destinations by driving from the home to readily available boat ramps then thru the water, up a boat ramp near the destination and then drive on the roads to the final destination and back home all from the same vehicle. A roadable GEV has the added advantage of a smoother ride, lower surface resistance, higher cruising speeds and/or lower energy/fuel consumption. The roadable Multiphibious Vehicle can operate over water, sand, weeds, floating wood, subsurface or shallow stumps, snow, ice and any other semi-smooth flat surface or convert to be able to fly like a conventional aircraft (by following FAA rules). The roadable Multiphibious Vehicle also protects marine life such as Manatee, Dolphins/Porpoises, whales, Sunfish, Rays, Crocodiles, Alligators and all types of fish that are near the surface since there is no propeller or boat hull in the water.

Another environmental feature is that the engine-motor, fuel, batteries and transmission are fully contained in the central module (for collection and proper disposal) such that no motor oil, lubrication, battery fluids, fuel or other contaminants will leak into the water. An all electric and hybrid-electric, diesel-electric or gas-electric versions of this invention are all possible with this Multiphibious Vehicle's modular-adaptable design.

SUMMARY AND OBJECTS OF THE INVENTION

A roadable, adaptable-modular, multiphibious-amphibious ground-effect or flying, car-boat-plane or surface-effect motorcycle. A pivoting high wing using the NACA 23112 or similar airfoil provides longitudinal stability through up/down drafts and changes in wing or power settings. This airfoil precludes longitudinal pitch issues that are typical of surface-effect vehicles. The altitude and angle of attack of the pivoting wing is also changed by the surface-effect sensor rods. When the vehicle is on the surface (of water, snow or ice) and the speed is increased, the surface-effect sensor rod pushes the main wing to an increased angle of attack providing additional lift for take-off. As the vehicle lifts out of the water, the forces on the surface-effect sensor rod decrease until reaching an equilibrium point. If the vehicle is pushed up by an updraft wind or if there is a downward angle due to wave actions then the forces decrease and the vehicle glides toward the water surface. As it nears the surface or as a wave comes up the forces increase and the main wing is increased in lift similar to take-off. As such the vehicle follows the rolling smooth sea "swells" but averages out the smaller "wind-waves" or "chop" for a smoother ride. The airfoil can also be "locked" in place (normally after take-off) to provide conventional aircraft type controls for those applications where FAA certification allows for full flight mode. For take-off all that is required is the application of additional power which increases thrush from the prop/ducted fans. As power is decreased the vehicle will tend to move towards the water surface which automatically increases the angle of attack similar to a conventional aircraft as it flares for touch-down. The surface-effect sensor rods (or electronics) will attempt to keep the vehicle in the air and away from the surface until there is no longer enough airspeed to maintain altitude at which point it settles to the water surface at or near the stall speed of the main wing. A few degrees of wing-tip-wash-out angle will provide the smooth transitions near the stall speed. The stability of this airfoil also provides increased safety for operations near the surface (water, swamps, snow, ice, sand, etc.) since the angle of attack is automatically controlled, there is no nose-down pitch during take-off (departure stall is not possible), during landing (landing stall is not possible) and up/down drafts are instantly corrected without pilot/ driver inputs. The wings fold (top or side) for driving mode and airboat mode. Between one and 4 surface-effect sensor rods provide the automatic altitude control for operations in surface-effect mode but can be use to aid take-off and landing when in aircraft-flight mode. The surface-effect sensor rods can be retracted for airboat mode and driving mode. Horizontal stabilizer and elevator may also be controlled by surface-effect sensor rods to provide automatic trim and balance to level the vehicle for passenger comfort and optimal landing attitude. The hull/fuselage consists of three main modules: The main central module for engine, transmission, passengers, wings and cargo storage, the forward module for one or two wheels with or without a differential and the aft module which includes one or two wheels with or without a differential. The forward and aft modules may also contain batteries or fuel as needed for balance. Surface-effect sensor rods may be mounted in any of the three modules depending on the configuration and use of the vehicle. Since the main wing pivot to change angle of attack, a step is not required but some configurations may use a step to improve performance. The pivoting wing allows the wheels to be placed at the extreme front and rear of the vehicle (for best road performance) since the wing pivots and rotation of the entire fuselage is not required for take-off. The operation of the wing pivot means that the hull-fuselage shape is not crucial (such as having a step or having main landing gear near the center of gravity). This gives the designer much more flexibility in the design, configuration and layout of the passenger and storage areas. Ducted fans are used for several reasons. First the ducted fans provide the required thrust in a smaller diameter which allows the vehicle to fit into a standard single-car garage with the wings folded over the top of the ducted fans. The ducted fans also tend to reduce the noise level since the propeller tips can remain below the speed of sound due to the smaller diameter. The smaller diameter of the ducted fans also keeps the thrust line as low as possible and near the center of gravity to minimize the pitch effects during throttle changes.

BRIEF DESCRIPTION OF THE DRAWING

FIG. 1 is a typical configuration (side view).

DETAILED DESCRIPTION OF THE DRAWING

FIG. 1 shows a side view of the invention with the various parts numbers as follows: The main structure of the vehicle is the hull/fuselage 1. The front wheel(s) 2 and the back wheel(s) 3 provide traction and support on the ground while in the roadable car/motorcycle mode. The front wheel(s) may be either one or 2 wheels depending on the configuration required for specific applications. The front wheels are for on-road steering and may be powered or free rolling. The Rear wheel(s) may be powered or free rolling as well and could be either 1 or 2 wheels depending on the configuration requirements. Multiple wheeled versions (or extra wide wheels) may be required and is possible for lower surface contact force where needed for environmental protection.

The engine or motor 4 can be of any design and have either longitudinal or transverse shaft. It can use any "fuel" such as gas, propane, natural gas, all electric, electric-hybrid, turbine or even steam/air pressure. The only important requirement for the motor/engine is a rotating shaft that can provide the required horsepower for movement.

The transmission 5 is required for some configurations and may not be required for others such as electric depending on the horsepower to weight ratio and the rating of the motor/engine 4.

After the transmission there is a need to transfer the torque from the motor 4 to the wheels 2, 3 and prop/ducted fans 8. This can be done with chains 6, shafts 6 or belts 6 similar to the drive on many motorcycles, cars or airboats. A "jackshaft" 7 may also be required in many configurations to allow the engagement and disengagement of the wheels 2, 3 and ducted fans 8 since the prop/ducted fans should not be engaged while driving.

There are surface-effect sensor rods 9 that provide the vehicle with stability and attitude control. The turning control (not numbered) is done in a way similar to airboats (stick), motorcycles (handlebars), cars (steering wheel) or aircraft (control yoke or joy-stick), and many other craft. Rudders 11 can be tied into and coordinated with the turn and bank all done by a steering wheel or "stick(s)". Alternatively, the rudders can be control by the feet of the pilot similar to airplane depending on the requirements of the configuration and customer specifications.

The horizontal stabilizers 10 and/or elevator control 10 surfaces may be used for either "active" attitude control (similar to airplanes) or trim (similar to hovercraft) depending on the configuration requirements of the specific embodiment.

A key element of the invention is the double pivot joint 12 that supports the wing 17. The double pivot joint 12 allows the wing 17 to rotate back for wing folding which is required for driving mode, yacht tender mode and airboat mode as well as allow the rotation in the horizontal axis for the pitch control of the wing 17 independent from the hull/fuselage 1.

The helicopter or auto-gyro blades 13 are mounted near the center of gravity to provide for vertical take-off capability. If the helicopter/autogiro blades are un-powered then only one set is required but if pre-rotation or full helicopter capability is required then the coax configuration (as shown) would be used to prevent spinning such as would happen in the water or on ice.

At the bottom of FIG. 1, the modules are designated as follows: the forward module 14 is on the right side and includes the front wheels, and may include other items such as the surface-effect sensor rods, storage, batteries or fuel. The main center module is designated as item 15. The main center module contains the passenger area, engine/motor 4 and transmission 5 but may also include other items such as batteries, fuel, storage or vehicle specific items such as sports gear carrier-racks, bait live-wells or attachment points for items such as stretchers or carriers for injured people or animals that are rescued. On the far left is the aft module 16 which includes the rear wheel(s) 3, rudders 11, vertical stabilizers 11, horizontal stabilizers 10, elevators 10 and prop/ducted fans 8. The aft module 16 may include surface-effect-sensor rods 9, batteries, storage or other items needed for specific configurations.

Finally, the wing 17 is mounted high to minimize damage, ground loops and surface impacts (water, snow, ice, sawgrass, swamps or floating objects). The wing 17 can have added joints to fold into a smaller area for road transport. The wing 17 is designed to both fold and pivot to allow the overlapping of the trailing edges during the folding operation which allows the wing to fit into a more compact area. The pivoting of the wing 17 provides for changes in the angle of attach of the wing independent from the fuselage 1. The pivoting action is also required to provide the auto-stable longitudinal control and auto-altitude control which makes the vehicle very safe to use in close proximity to the surface.

DETAILED DESCRIPTION OF THE INVENTION

FIG. 1 shows a side view of the invention with the various parts numbers as follows: The main structure of the vehicle is the hull/fuselage 1. The fuselage/hull can be of any design that provides the needed rigidity and supports for all of the hardware (engine, running gear, wings, etc.), passengers and cargo. Some of the first embodiments of the invention will be sized and fabricated in such a way that the invention will fit into a single car garage. Having it fit into a standard single car garage has several advantages such as protection from weather and protection from theft. Having a standard size also allows it to fit into oil-change and other "service" facilities, parking garages and thru "car-size" drive-thru restaurants and toll booths. If a larger size is needed for a specific customer then a longer version can still work on the roads similar to limousines but would normally need to be parked outside of a standard garage or a standard parking space. Still large configurations might be used for tours or for other commercial uses such as ferry or shuttle services (which could also carry cars).

The front wheel(s) 2 and the back wheel(s) 3 provide steering, traction and support on the ground while in the roadable car/motorcycle mode. The front wheel(s), which are included as part of the forward module, may be either 1 or 2 wheels depending on the configuration required for specific applications. The front wheels are for on-road steering and may be powered or free rolling. The Rear wheel(s) may be powered or free rolling as well and could be either 1 or 2 wheels depending on the configuration requirements. The wheels may be designed to retract or have covers that retract to uncover the wheels for road use and provide a cover to streamline the wheels during higher speed travel in air, on water or over other surfaces. The retraction or wheel-covering method depends on the customer requirements.

The engine or motor 4 can be of any design and have either longitudinal or transverse shaft. It can use any "fuel" such as gas, propane, natural gas, all electric, electric-hybrid, turbine or even steam/air pressure. The only requirement for the motor/engine is a rotating shaft that can provide the required horsepower for wheel drive, ducted fan drive which provide the forward movement.

The transmission 5 is required for some configurations and may not be required for others. An example configuration would be dual electric motors each drive one ducted fan and can be tied together to drive a single rear wheel or the dual motors could each drive a separate rear wheel depending on the customer requirements. Any engine-motor combination or configuration can be selected based on the customer's requirements and also depending on the horsepower to weight ratio and the rating of the motor/engine 4.

After the transmission there is a need to transfer the torque from the motor 4 to the wheels 2, 3 and ducted fans or propellers 8. This can be done with chains 6, shafts 6 or belts 6 similar to the drive on many motorcycles, cars or airboats. A "jack-shaft" 7 may also be required in most configurations to allow the engagement and disengagement of the wheels 2, 3 and prop/ducted fans 8 since the ducted fans should not be engaged while driving. Other drive elements such as counter-rotation shafts will be desired by many customers to counter-act the torque effects of the ducted fans. The counter-rotation can be done in a manner similar to airboats, aircraft or thru the use of separate motors or gears and additional shafts as determined by the customer's requirement, performance, and other engineering reasons.

There are surface-effect sensor rods 9 that provide the vehicle with stability and attitude control. The turning control (not numbered) is done in a way similar to airboats (stick), motorcycles (handlebars), cars (steering wheel) or aircraft (control yoke), and many other craft. Rudders 11 can be tied into and coordinated with the turn and bank all done by a steering wheel or "stick(s)". Alternatively, the rudders can be control by the feet of the pilot similar to airplane depending on the requirements of the configuration and customer specifications.

The horizontal stabilizers 10 and/or elevator control 10 surfaces may be used for either "active" attitude control (similar to airplanes) or trim (similar to hovercraft) depending on the configuration requirements of the specific embodiment and customer requirements.

A key element of the invention is the double pivot joint 12 that supports the wing 17. The double pivot joint 12 allows the wing 17 to rotate back for wing folding which is required for driving mode and airboat mode as well as allow the rotation in the horizontal axis for the pitch control of the wing 17 independent from the hull/fuselage 1. The single strut support has a pivot below the wing pivot to allow the wing to fold back. The single (one for each wing) support strut is designed to handle both compression and tension loads. The wing support strut also has a horizontal pivot that assists the wing pivot for angle of attack changes when the wing is deployed. During retraction and as part of the folding the horizontal pivot also allows the wings to tilt slightly which permits the trailing edges to overlap, allowing the wings to fold into a more compact plan-form. There are two tension wires which provide the retraction and deployment forces as well as providing the lateral support for the wings when deployed. The retraction/deployment wires (cables) can be manipulated using either a light-weight manual method (cranks or hand moved and attached) or automated with motors (electric, pneumatic or hydraulic).

The helicopter or auto-gyro blades are mounted near the center of gravity to provide for vertical take-off capability. If the helicopter/autogiro blades are unpowered then only one set is required but if pre-rotation on water, ice or snow is needed or full helicopter capability is required then the coax configuration (as shown) would be used to prevent counter-rotational spinning such as would happen in the water, snow or ice.

At the bottom of FIG. 1, the modules are designated as follows: the forward module 14 is on the right side and includes the front wheels, and may include other items (also for balance) such as the surface-effect sensor rods, storage, batteries or fuel. The main center module is designated as item 15. The main center module contains the passenger/cargo area, engine/motor 4 and transmission 5 but may also include other items such as batteries, fuel, storage or vehicle specific items such as sports gear carrier-racks, bait live-wells or attachment points for items such as stretchers or carriers for injured people or animals that are rescued. On the far left is the aft module 16 which includes the rear wheel(s) 3, rudders 11, vertical stabilizers 11, horizontal stabilizers 10, also called elevators 10 and prop/ducted fans 8. The aft module 16 may include surface-effect-sensor rods 9, batteries, storage or other items needed for specific configurations.

Finally, the wing 17 is mounted high to minimize damage, ground loops and surface impacts (water, snow, ice, sawgrass, swamps or floating objects). The wing 17 can have added joints near the wing tips to fold into a smaller area for road transport or to fit into a single car standard garage. The wing 17 is designed to both fold and pivot to allow the overlapping of the trailing edges during the folding operation which allows the wing to fit into a more compact area. The pivoting of the wing 17 provides for changes in the angle of attach of the wing independent from the fuselage 1. The pivoting action is also required to provide the auto-stable longitudinal control and auto-altitude control which makes the vehicle very safe to use in close proximity to the surface.

As can be seen from the drawing, a ground-effect vehicle for traveling over a surface includes a hull 1. The hull 1 has a forward section 14 and an aft section 16 situated axially opposite the forward section 14. The ground-effect vehicle further includes a motor 4 situated on the hull 1. Also, there is a propeller 8 situated on the hull 1 and operatively coupled to the motor 4, the propeller 8 providing propulsion for moving the vehicle over the surface.

The ground-effect vehicle also includes a wing 17 pivotally mounted on the hull 1. The wing 17 is movable in pitch relative to the hull 1. The ground-effect vehicle further includes a first surface-effect sensor rod 9a pivotally mounted on the hull 1. The first surface-effect sensor rod 9a is in the form of an elongated member extending downwardly from the hull 1 to selectively contact the surface over which the vehicle travels. The first surface-effect sensor rod 9a is operatively linked to the wing 17 such that pivotal movement of the first surface-effect sensor rod 9a due to the first surface-effect sensor rod 9a selectively contacting the surface over which the vehicle travels causes the wing 17 to pivot on the hull 1 and change the pitch thereof relative to the hull 1.

In a preferred form of the invention, the ground-effect vehicle further includes a first cable-and-pulley system 18 operatively linking the first surface-effect sensor rod 9a to the wing 17. More specifically, for this preferred embodiment, the first surface-effect sensor rod 9a is pivotally mounted on the hull 1 at a first pivot point 19 on the first surface-effect sensor rod 9a. The first pivot point 19 defines a first pivot side 20 of the first surface-effect sensor rod 9a and a second pivot side 21 of the first surface-effect sensor rod 9a which is opposite the first pivot side 20 of the first surface-effect sensor rod 9a such that the first pivot point 19 is between the first pivot side 20 and the second pivot side 21.

Furthermore, the wing 17 is preferably pivotally mounted on the hull 1 at a second pivot point 12 on the wing 17. The second pivot point 12 defines a first pivot side 22 of the wing 17 and a second pivot side 23 of the wing 17 which is opposite the first pivot side 22 of the wing 17 such that the second pivot point 12 is between the first pivot side 22 of the wing 17 and the second pivot side 23 of the wing 17.

The first cable-and-pulley system 18, mentioned previously, preferably includes a first cable 24 and a first pulley 25 having a circumference, and a second cable 26 and a second pulley 27 having a circumference. The first cable 24 engages at least a portion of the circumference of the first pulley 25, the second cable 26 engages at least a portion of the circumference of the second pulley 27. Each of the first cable 24 and the second cable 26 has a first axial end 28 and a second axial end 29 situated opposite the first axial end 28. The first axial end 28 of the first cable 24 is coupled to the wing 17 on the first pivot side 22 of the wing 17 defined by the second pivot point 12. Furthermore, the first axial end 28 of the second cable 26 is coupled to the wing 17 on the second pivot side 23 of the wing 17 defined by the second pivot point 12. The second axial end 29 of the first cable 24 is coupled to the first surface-effect sensor rod 9a on the first pivot side 20 of the first surface-effect sensor rod 9a defined by the first pivot point 19, and the second axial end 29 of the second cable 26 is coupled to the first surface-effect sensor rod 9a on the second pivot side 21 of the first surface-effect sensor rod 9a defined by the first pivot point 19.

The ground-effect vehicle may further include a double pivot joint 12 pivotally mounting the wing 17 to the hull 1. The double pivot joint 12 allows the wing 17 to 1) move in pitch relative to the hull 1, and 2) rotate in a direction toward the aft section 16 of the hull 1 to allow the wing 17 to fold.

Preferably, the first surface-effect sensor rod 9a is pivotally mounted on the forward section 14 of the hull 1. The first surface-effect sensor rod 9a is pivotally movable on the hull 1 in a first direction toward the aft section 16 of the hull 1 and in a second direction away from the aft section 16 of the hull 1. The wing 17, pivotally mounted on the hull 1, has a front edge 30 facing the front section 14 of the hull 1 and a rear edge 31 situated opposite the front edge 30 and facing the aft section 16 of the hull 1.

When the first surface-effect sensor rod 9a is pivotally moved on the hull 1 in the first direction toward the aft section 16 of the hull 1, the first surface-effect sensor rod 9a causes the front edge 30 of the wing 17 to move in a direction upwardly and away from the hull 1 and the rear edge 31 of the wing to move in a direction downwardly and toward the hull 1. When the first surface-effect sensor rod 9a is pivotally moved on the hull 1 in the second direction away from the aft section 16 of the hull 1, the first surface-effect sensor rod 9a causes the rear edge 31 of the wing 17 to move in a direction upwardly and away from the hull 1 and the front edge 30 of the wing 17 to move in a direction downwardly and toward the hull 1.

In another preferred form of the present invention, the ground-effect vehicle further preferably includes an elevator 10, as shown in the drawing. The elevator 10 is pivotally mounted on the hull 1 and is movable in pitch relative to the hull 1.

In this preferred form, the ground-effect vehicle further includes a second surface-effect sensor rod 9b pivotally mounted on the hull 1. Like the first surface-effect sensor rod 9a, the second surface-effect sensor rod 9b is preferably in the form of an elongated member extending downwardly from the hull 1 to selectively contact the surface over which the vehicle travels. The second surface-effect sensor rod 9b is operatively linked to the elevator 10 such that pivotal movement of the second surface-effect sensor rod 9b due to the second surface-effect sensor rod 9b selectively contacting the surface over which the vehicle travels causes the elevator 10 to pivot on the hull 1 and change the pitch thereof relative to the hull 1. Preferably, the second surface-effect sensor rod 9b is pivotally mounted on the aft section 16 of the hull 1.

In an even more preferred form of the present invention, the ground-effect vehicle further includes a second cable-and-pulley system 32 operatively linking the second surface-effect sensor rod 9b to the elevator 10.

In this more preferred form of the ground-effect vehicle, the second surface-effect sensor rod 9b is pivotally mounted on the hull 1 at a third pivot point 33 on the second surface-effect sensor rod 9b. This third pivot point 33 defines a first pivot side 34 of the second surface-effect sensor rod 9b and a second pivot side 35 of the second surface-effect sensor rod 9b which is opposite the first pivot side 34 of the second surface-effect sensor rod 9b such that the third pivot point 33 is situated between the first pivot side 34 of the second surface-effect sensor rod 9b and the second pivot side 35 of the second surface-effect sensor rod 9b.

Preferably, the elevator 10, pivotally mounted on the hull 1, includes a front edge 36 facing the front section 14 of the hull 1 and a rear edge 37 situated opposite the front edge 36 and facing the aft section 16 of the hull 1.

The second cable-and-pulley system 32, mentioned previously, preferably includes a third cable 38 and a third pulley 39 having a circumference, and a fourth cable 40 and a fourth pulley 41 having a circumference. The third cable 38 engages at least a portion of the circumference of the third pulley 39, and the fourth cable 40 engages at least a portion of the circumference of the fourth pulley 41.

Each of the third cable 38 and the fourth cable 40 has a first axial end 42 and a second axial end 43 situated opposite the first axial end 42. The first axial end 42 of the third cable 38 is coupled to the elevator 10 in proximity to the rear edge 37 of the elevator 10. Similarly, the first axial end 42 of the fourth cable 40 is coupled to the elevator 10 in proximity to the front edge 36 of the elevator 10. The second axial end 43 of the third cable 38 is coupled to the second surface-effect sensor rod 9b on the second pivot side 35 of the second surface-effect sensor rod 9b defined by the third pivot point 33, and the second axial end 43 of the fourth cable 40 is coupled to the second surface-effect sensor rod 9b on the first pivot side 34 of the second surface-effect sensor rod 9b defined by the third pivot point 33.

Preferably, the second surface-effect sensor rod 9b is pivotally movable on the hull 1 in a first direction toward the forward section 14 of the hull 1 and in a second direction away from the forward section 14 of the hull 1.

When the second surface-effect sensor rod 9b is pivotally moved on the hull 1 in the first direction toward the forward section 14 of the hull 1, the second surface-effect sensor rod 9b causes the elevator 10 to pivotally move on the hull 1 such that the rear edge 37 of the elevator 10 moves in a direction upwardly and away from the hull 1 and the front edge 36 of the elevator 10 moves in a direction downwardly and toward the hull 1. When the second surface-effect sensor rod 9b is pivotally moved on the hull 1 in the second direction away from the forward section 14 of the hull 1, the second surface-effect sensor rod 9b causes the elevator 10 to pivotally move on the hull 1 such that the front edge 36 of the elevator 10 is moved in a direction upwardly and away from the hull 1 and the rear edge 37 of the elevator 10 is moved in a direction downwardly and toward the hull 1.

In a more preferred form, and as shown in the drawing, the ground-effect vehicle further includes retractable wheels 2, 3 mounted on the hull 1. Preferably, at least one wheel 2 of the retractable wheels 2, 3 is mounted on the forward section 14 of the hull 1, and at least another wheel 3 of the retractable wheels 2, 3 is mounted on the aft section 16 of the hull 1. Even more preferably, at least one of the wheels 3 is operatively coupled to the motor 4.

I claim:

1. A ground-effect vehicle for traveling over a surface, which comprises:
   a hull, the hull having a forward section and an aft section situated axially opposite the forward section;
   a motor situated on the hull;
   a propeller situated on the hull and operatively coupled to the motor, the propeller providing propulsion for moving the vehicle over the surface;
   a high wing pivotally mounted on top of the hull, the wing being movable in pitch relative to the hull; and
   a first surface-effect sensor rod pivotally mounted on the hull, the first surface-effect sensor rod being an elongated member extending downwardly from the hull to selectively contact the surface over which the vehicle travels, the first surface-effect sensor rod being operatively linked to the wing such that pivotal movement of the first surface-effect sensor rod due to the first surface-effect sensor rod selectively contacting the surface over which the vehicle travels causes the wing to pivot on the hull and change the pitch thereof relative to the hull.

2. The ground-effect vehicle as defined by claim 1, which further comprises:
   a first cable-and-pulley system operatively linking the first surface-effect sensor rod to the wing.

3. The ground-effect vehicle as defined by claim 2, wherein the first surface-effect sensor rod is pivotally mounted on the hull at a first pivot point on the first surface-effect sensor rod, the first pivot point defining a first pivot side of the first surface-effect sensor rod and a second pivot side of the first surface-effect sensor rod which is opposite the first pivot side of the first surface-effect sensor rod such that the first pivot point is between the first pivot side and the second pivot side;
   wherein the wing is pivotally mounted on the hull at a second pivot point on the wing, the second pivot point defining a first pivot side of the wing and a second pivot side of the wing which is opposite the first pivot side of the wing such that the second pivot point is between the first pivot side of the wing and the second pivot side of the wing; and
   wherein the first cable-and-pulley system includes a first cable and a first pulley having a circumference, and a second cable and a second pulley having a circumference, the first cable engaging at least a portion of the circumference of the first pulley, the second cable engaging at least a portion of the circumference of the second pulley, each of the first cable and the second cable having a first axial end and a second axial end situated opposite the first axial end, the first axial end of the first cable being coupled to the wing on the first pivot side of the wing defined by the second pivot point, the first axial end of the second cable being coupled to the wing on the second pivot side of the wing defined by the second pivot point, the second axial end of the first cable being coupled to the first surface-effect sensor rod on the first pivot side of the first surface-effect sensor rod defined by the first pivot point, and the second axial end of the second cable being coupled to the first surface-effect sensor rod on the second pivot side of the first surface-effect sensor rod defined by the first pivot point.

4. The ground-effect vehicle as defined by claim 1, which further comprises:
   a double pivot joint pivotally mounting the wing to the hull, the double pivot joint allowing the wing to 1) move in pitch relative to the hull, and 2) rotate in a direction towards the aft section of the hull to allow the wing to fold.

5. The ground-effect vehicle as defined by claim 1, wherein the first surface-effect sensor rod is pivotally mounted on the forward section of the hull.

6. The ground-effect vehicle as defined by claim 5, wherein the first surface-effect sensor rod is pivotally movable on the hull in a first direction toward the aft section of the hull and in a second direction away from the aft section of the hull;
   wherein the wing pivotally mounted on the hull has a front edge facing the front section of the hull and a rear edge situated opposite the front edge and facing the aft section of the hull;
   wherein, when the first surface-effect sensor rod is pivotally moved on the hull in the first direction toward the aft section of the hull, the first surface-effect sensor rod causes the front edge of the wing to move in a direction away from the hull and the rear edge of the wing to move in a direction toward the hull; and
   wherein, when the first surface-effect sensor rod is pivotally moved on the hull in the second direction away from the aft section of the hull, the first surface-effect sensor rod causes the rear edge of the wing to move in a direction away from the hull and the front edge of the wing to move in a direction toward the hull.

7. The ground-effect vehicle as defined by claim 1, which further comprises:
- an elevator, the elevator being pivotally mounted on the hull, the elevator being movable in pitch relative to the hull; and
- a second surface-effect sensor rod pivotally mounted on the hull, the second surface-effect sensor rod being an elongated member extending downwardly from the hull to selectively contact the surface over which the vehicle travels, the second surface-effect sensor rod being operatively linked to the elevator such that pivotal movement of the second surface-effect sensor rod due to the second surface-effect sensor rod selectively contacting the surface over which the vehicle travels causes the elevator to pivot on the hull and change the pitch thereof relative to the hull.

8. The ground-effect vehicle as defined by claim 7, which further comprises:
- a second cable-and-pulley system operatively linking the second surface-effect sensor rod to the elevator.

9. The ground-effect vehicle as defined by claim 8, wherein the second surface-effect sensor rod is pivotally mounted on the hull at a third pivot point on the second surface-effect sensor rod, the third pivot point defining a first pivot side of the second surface-effect sensor rod and a second pivot side of the second surface-effect sensor rod which is opposite the first pivot side of the second surface-effect sensor rod such that the third pivot point is situated between the first pivot side of the second surface-effect sensor rod and the second pivot side of the second surface-effect sensor rod;
- wherein the elevator pivotally mounted on the hull includes a front edge facing the front section of the hull and a rear edge situated opposite the front edge and facing the aft section of the hull; and
- wherein the second cable-and-pulley system includes a third cable and a third pulley having a circumference, and a fourth cable and a fourth pulley having a circumference, the third cable engaging at least a portion of the circumference of the third pulley, the fourth cable engaging at least a portion of the circumference of the fourth pulley, each of the third cable and the fourth cable having a first axial end and a second axial end situated opposite the first axial end, the first axial end of the third cable being coupled to the elevator in proximity to the rear edge of the elevator, the first axial end of the fourth cable being coupled to the elevator in proximity to the front edge of the elevator, the second axial end of the third cable being coupled to the second surface-effect sensor rod on the second pivot side of the second surface-effect sensor rod defined by the third pivot point, and the second axial end of the fourth cable being coupled to the second surface-effect sensor rod on the first pivot side of the second surface-effect sensor rod defined by the third pivot point.

10. The ground-effect vehicle as defined by claim 7, wherein the second surface-effect sensor rod is pivotally mounted on the aft section of the hull.

11. The ground-effect vehicle as defined by claim 10, wherein the second surface-effect sensor rod is pivotally movable on the hull in a first direction toward the forward section of the hull and in a second direction away from the forward section of the hull;
- wherein, when the second surface-effect sensor rod is pivotally moved on the hull in the first direction toward the forward section of the hull, the second surface-effect sensor rod causes the elevator to pivotally move on the hull such that the rear edge of the elevator moves in a direction away from the hull and the front edge of the elevator moves in a direction toward the hull; and
- wherein, when the second surface-effect sensor rod is pivotally moved on the hull in the second direction away from the forward section of the hull, the second surface-effect sensor rod causes the elevator to pivotally move on the hull such that the front edge of the elevator is moved in a direction away from the hull and the rear edge of the elevator is moved in a direction toward the hull.

12. The ground-effect vehicle as defined by claim 1, which further comprises:
- retractable wheels mounted on the hull.

13. The ground-effect vehicle as defined by claim 12, wherein at least one wheel of the retractable wheels is mounted on the forward section of the hull, and wherein at least another wheel of the retractable wheels is mounted on the aft section of the hull.

14. The ground-effect vehicle as defined by claim 12, wherein at least one of the wheels is operatively coupled to the motor.

* * * * *